United States Patent
Brehm et al.

(10) Patent No.: US 11,350,177 B2
(45) Date of Patent: *May 31, 2022

(54) ADAPTIVE ON-SCREEN GUIDE BASED ON CHANNEL OR CONTENT TRANSITION COMMANDS

(71) Applicant: Rovi Guides, Inc., San Jose, CA (US)

(72) Inventors: Michael James Brehm, Allen, TX (US); Benjamin Harden, Coronado, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,682

(22) Filed: May 31, 2019

(65) Prior Publication Data
US 2020/0382844 A1 Dec. 3, 2020

(51) Int. Cl.
*H04N 21/482* (2011.01)
*H04N 21/438* (2011.01)
*H04N 21/84* (2011.01)
*H04N 21/454* (2011.01)

(52) U.S. Cl.
CPC ..... *H04N 21/4825* (2013.01); *H04N 21/4383* (2013.01); *H04N 21/454* (2013.01); *H04N 21/4821* (2013.01); *H04N 21/84* (2013.01)

(58) Field of Classification Search
CPC .......... H04N 21/4825; H04N 21/454; H04N 21/4821; H04N 21/4383; H04N 21/84; H04N 21/462; H04N 21/4667; H04N 21/4668; H04N 21/4532; H04N 21/44222; H04N 21/25891; H04N 5/45; H04N 21/4263; H04N 21/4663; H04N 21/4826
See application file for complete search history.

(56) References Cited

U.S. PATENT DOCUMENTS 6,817,027 B1 * 11/2004 Curreri .............. H04N 5/44543
348/E5.105
7,761,892 B2 7/2010 Ellis
(Continued)

OTHER PUBLICATIONS

U.S. Appl. No. 16/427,674, filed May 31, 2019, Michael James Brehm.
(Continued)

*Primary Examiner* — Alazar Tilahun
(74) *Attorney, Agent, or Firm* — Haley Guiliano LLP

(57) ABSTRACT

Systems and methods for generating a content item sequence for display via an abbreviated on-screen guide are disclosed herein. Content selection commands are entered via a user interface of a computing device. Transition data, which describes content item playback transitions caused by the content selection commands, is stored in a buffer. Based on the transition data, a content family, which comprises a plurality of content items, is generated. A determination is made as to whether a content item currently being played back is included in the content family. In response to determining that the currently played-back content item is included in the content family, an on-screen guide, which comprises an abbreviated content item listing of the plurality of content items of the content family, is generated for display.

20 Claims, 11 Drawing Sheets

(56) References Cited

U.S. PATENT DOCUMENTS

| | | | | |
|---|---|---|---|---|
| 2006/0026645 | A1* | 2/2006 | Milnes | H04N 21/4135 |
| | | | | 725/46 |
| 2007/0188665 | A1* | 8/2007 | Watson | H04N 5/4401 |
| | | | | 348/731 |
| 2010/0083310 | A1* | 4/2010 | VanDuyn | H04N 5/44543 |
| | | | | 725/38 |
| 2015/0373407 | A1* | 12/2015 | Vondersaar | H04N 21/482 |
| | | | | 725/46 |
| 2018/0357567 | A1 | 12/2018 | Rubino | |

OTHER PUBLICATIONS

Anonymous, "ChannelRank: a method of ranking television channels," Research Disclosure, Kenneth Mason Publications, Hampshire, UK, GB, 514(36)180 (2007) (5 Pages).

PCT International Search Report for International Application No. PCT/US2020/031894, dated Jul. 14, 2020 (17 Pages).

* cited by examiner

| Account ID | Tune-from Channel | Tune-to Channel | Date | Time |
|---|---|---|---|---|
| 63320 | 502 | 600 | 4/18/2019 | 6:31:12 PM |
| 63320 | 600 | 577 | 4/18/2019 | 6:58:46 PM |
| 63320 | 577 | 843 | 4/18/2019 | 6:59:35 PM |
| 63320 | 843 | 774 | 4/18/2019 | 7:01:29 PM |
| 63320 | 579 | 693 | 4/19/2019 | 6:04:57 AM |

Tune-to Channel

|   | 1 | 2 | 3 | 4 | 5 |
|---|---|---|---|---|---|
| 1 | - | $B_{12}$ | $B_{13}$ | $B_{14}$ | $B_{15}$ |
| 2 | $B_{21}$ | - | $B_{23}$ | $B_{24}$ | $B_{25}$ |
| 3 | $B_{31}$ | $B_{32}$ | - | $B_{34}$ | $B_{35}$ |
| 4 | $B_{41}$ | $B_{42}$ | $B_{43}$ | - | $B_{44}$ |
| 5 | $B_{51}$ | $B_{52}$ | $B_{53}$ | $B_{54}$ | - |

(Rows: Tune-from Channel)

Tune-to Channel (Within Day/Time Frame)

|   | 1 | 2 | 3 | 4 | 5 |
|---|---|---|---|---|---|
| 1 | - | $F_{12}$ | $F_{13}$ | $F_{14}$ | $F_{15}$ |
| 2 | $F_{21}$ | - | $F_{23}$ | $F_{24}$ | $F_{25}$ |
| 3 | $F_{31}$ | $F_{32}$ | - | $F_{34}$ | $F_{35}$ |
| 4 | $F_{41}$ | $F_{42}$ | $F_{43}$ | - | $F_{44}$ |
| 5 | $F_{51}$ | $F_{52}$ | $F_{53}$ | $F_{54}$ | - |

(Rows: Tune-from Channel (Within Day/Time Frame))

FIG. 8

| Account ID | Channel Family ID | Channels | | | | | | |
|---|---|---|---|---|---|---|---|---|
| 63320 | 668 | 502 | 600 | 577 | 843 | 269 | 643 | 422 |
| 63320 | 669 | 702 | 533 | 557 | 485 | 261 | 342 | 325 |
| 63320 | 670 | 512 | 555 | 675 | 589 | 634 | 277 | 237 |
| 63320 | 671 | 442 | 688 | 278 | 544 | 694 | 689 | 748 |
| 63320 | 672 | 258 | 600 | 667 | 320 | 250 | 748 | 553 |

FIG. 12

ADAPTIVE ON-SCREEN GUIDE BASED ON CHANNEL OR CONTENT TRANSITION COMMANDS

BACKGROUND

The present disclosure relates to on-screen content guides and, more particularly, to systems and related processes for generating sequences of channels and/or content items for display via an abbreviated on-screen guide based on previously entered content and/or channel transition commands.

SUMMARY

A full-screen content guide typically provides detailed information about a linear content schedule, such as details about currently airing and upcoming shows, and provides for user-friendly navigation throughout a channel lineup. A full-screen content guide is thus suitable for browsing through the channel lineup for something new to watch when a user is uninterested in the currently displayed content. A full-screen content guide, however, often dominates the available area of a display. Accordingly, the user may desire an alternative to a full-screen content guide when the user wishes to browse guide content without significantly interrupting the viewing experience.

One alternative to a full-screen content guide is an abbreviated on-screen content guide. An abbreviated on-screen content guide, sometimes referred to as a one-line guide, enables a user to view a relatively small sampling of linear guide data (such as what's on next) while minimizing interruption of the viewing experience. Abbreviated guides provide a non-intrusive "what's on/what's next" discovery mechanism for linear content. Conventional abbreviated guides, however, merely provide a limited view of the full-screen guide with a more constrained navigation experience. That is, a typical abbreviated guide merely displays the same data used by a full-screen guide, only in a different viewing format. For example, an abbreviated guide may display guide data for a current channel and enable the user to navigate one channel at a time in either direction in a channel lineup. An abbreviated guide can therefore create a cumbersome user experience when navigating across many channels, particularly since a user's favorite channels are often spaced a considerable distance apart in a channel lineup. The suitability of abbreviated guides is thus limited to merely indicating "what's on/what's next" for the current channel and other channels immediately before or after it in the channel lineup. For example, if a user is watching ESPN, the abbreviated guide may be helpful to browse upcoming programs on ESPN, ESPN2, ESPNEWS, and ESPN Classic, but unhelpful for scrolling through to movie channels or local channels, which are typically much farther away in the channel lineup.

One approach to overcoming the navigational challenges of a conventional abbreviated guide is to enable each user to create a list of their favorite channels. Such a favorite channels list is typically applied as a filter to an abbreviated guide to restrict the list of available channels to only those the user has pre-selected as favorites. For instance, a user may enter a menu screen to create a new favorite channels list and then scroll through the channel lineup to select the individual channels as favorites. Since there are often multiple users per household, a content provider account for the household may include several favorites lists. In such cases, each user repeats this exercise to create their favorite channels list and/or to update their favorite channels list when the channel lineup changes or when new programming causes a change in user preference toward particular channels. To make use of their favorite channels list, each user selects an option in the abbreviated guide to enable their favorite channels list. Favorite channels lists thus can be tedious to create and manage, and also tend not to account for variances in user mood or combinations of users. Further, once favorite channels are set, barring manual updates of a favorite channels list by a user, the list may not promote discovery of new channels or programs that may be of interest.

In addition, manually created favorite channels lists tend to be relatively large, since they tend to encompass all of the various moods and habits of the user. For example, a user who enjoys watching college football, sitcom re-runs from a particular decade, and new movies might include in their favorite channels list numerous sports channels, channels that host syndicated shows, and premium movie channels. In such an instance, for example, if the user wants to utilize an abbreviated guide to navigate through channels to browse college football games available on a Saturday afternoon, the user may be required to scroll through a large number of channels not of interest to the user at that time, even with the user's favorite channels list employed. One alternative involves creating even more favorites lists or sub-lists for the user to fine-tune channel lineups, but that becomes even more tedious for the user to create, manage, select, and utilize.

In view of the foregoing, the present disclosure provides systems and related methods that can predict which channels will be likely targets for a channel tune given past user behavior, current channel viewing activities and popularity, thus providing a way to adapt a channel lineup in a one-line guide to include only the most relevant linear content for the current user. The systems and methods described herein avoid the need to manually add channels to a favorites list and then manually select and enable the favorites list via an on-screen guide. In some aspects, the systems and methods described herein can also infer a user's mood and/or a particular combination of users viewing content together, learn channel groupings based on user mood and/or user combination, and adaptively enable a channel list appropriate based on user mood and/or user combination. In yet another aspect, the systems and methods described herein also constrain processing, memory, and storage requirements to allow for distributed implementation on client devices themselves.

In one example, the present disclosure provides a system for generating a channel sequence for display via an abbreviated on-screen guide. The system comprises a communication port, a memory, and control circuitry. The communication port is configured to receive channel tuning commands entered via a user interface. The memory is configured to store, in a buffer, channel tuning data describing channel transitions caused by the channel tuning commands. In some examples, the channel tuning data comprises, for each of the received channel tuning commands, a tune-from channel identifier, a tune-to channel identifier, and at least one of a transition date identifier or a transition time identifier. Based on the channel tuning data, the control circuitry is configured to generate a channel family comprising a plurality of channels. A determination is then made as to whether a currently tuned channel is included in the channel family. The control circuitry, for instance, may determine whether the currently tuned channel is included in the channel family by obtaining an identifier of the currently tuned channel, retrieving identifiers of the plurality of channels from the memory, and determining whether the identifiers of the plurality of channels of the channel family include the currently tuned channel identifier. In response to determining that the currently tuned channel is included in the channel family, an on-screen guide, which comprises an abbreviated channel listing of the plurality of channels of the channel family, is generated for display.

In various aspects, based on the channel tuning data, the control circuitry is configured to generate a channel transition matrix that is used as a basis for generating the channel family. Each entry of the channel transition matrix indicates a respective number of channel transitions from a first channel to a second channel caused by the channel tuning commands.

In another example, the control circuitry is configured to generate a filtered channel transition matrix that is used as a basis for generating the channel family. For instance, the control circuitry may determine a current day of the week and/or a current time and then filter the stored channel tuning data to include only channel tuning data for channel tuning commands received on a day or at a time within a degree of proximity to the current day of the week and/or the current time. The control circuitry can then generate a filtered channel transition matrix based on the filtered channel tuning data, with each entry of the filtered channel transition matrix indicating a respective number of channel transitions from a first channel to a second channel caused by the channel tuning commands for the filtered channel tuning data. In this manner, a channel family can be adaptively tailored to a user's viewing habits during similar days and/or times, thus improving the relevance or quality of channel family groupings.

In a further aspect, the control circuitry is configured to generate a baseline channel transition matrix based on the channel tuning data, with each entry of the baseline channel transition matrix indicating a respective number of channel transitions from a first channel to a second channel caused by the channel tuning commands. The control circuitry then determines a current day (e.g., day of the week) and/or a current time and filters the channel tuning data to include only channel tuning data for channel tuning commands received at a day or time within a degree of proximity to the current day of the week and/or current time. The control circuitry then generates a filtered channel transition matrix based on the filtered channel tuning data. Each entry of the filtered channel transition matrix indicates a respective number of channel transitions from the first channel to the second channel caused by the channel tuning commands for the filtered channel tuning data. The control circuitry then generates an augmented channel transition matrix based on a weighted combination of the baseline channel transition matrix and the filtered channel transition matrix. The channel family is then generated based on the augmented channel transition matrix.

In some examples, the control circuitry is further configured to generate, based on the augmented channel transition matrix, an undirected graph comprising channel vertices and channel transition edges, and to compute local clustering coefficients for each of the channel vertices. A respective channel family is then generated for each of the channel vertices based on the local clustering coefficients. The channel vertices correspond to channels in a channel lineup and the channel transition edges correspond to the channel transitions caused by the channel tuning commands. The control circuitry, in some instances, is configured to compare the local clustering coefficient to a threshold to determine whether the local clustering coefficient exceeds the threshold and generate the channel family in response to a determination that the local clustering coefficient exceeds the threshold.

In yet another example, the control circuitry is further configured to add a channel to the channel family based on collaborative filtering of additional channel families generated based on channel tuning data from other devices. In this manner, channel families may be augmented using a back-end server, for instance, to promote discovery of additional channels and/or content that may be of interest to the user, based on channels and/or content of interest to other users having exhibited interest in similar channels and/or content.

In accordance with another aspect, the present disclosure provides systems and related methods for generating a sequence of content items, content categories, content genres, and/or any other type of content identifier for display via an abbreviated on-screen guide. One such system, for example, includes a communication port, a memory, and control circuitry. The communication port is configured to receive content selection commands entered via a user interface. The memory is configured to store, in a buffer, transition data describing content item playback transitions caused by the content selection commands. In some examples, the transition data comprises, for each of the content selection commands, a transition-from content identifier, a transition-to content identifier, and at least one of a transition date identifier or a transition time identifier. Based on the transition data, the control circuitry is configured to generate a content family comprising a plurality of content items. A determination is then made as to whether a content item currently being played back is included in the content family. The control circuitry may determine whether the currently played-back content item is included in the content family, for example, by obtaining an identifier of the currently played-back content item; retrieving, from a memory, identifiers of the plurality of content items; and determining whether the identifiers of the plurality of content items of the content family include the currently played-back content item identifier. In response to determining that the currently played-back content item is included in the content family, an on-screen guide, which comprises an abbreviated content item listing of the plurality of content items of the content family, is generated for display.

In various aspects, the control circuitry is further configured to generate a transition matrix based on the transition data, with each entry of the transition matrix indicating a respective number of transitions from a first content item to a second content item caused by the content selection commands. In such aspects, the content family may be generated based on the transition matrix.

In another example, the control circuitry is further configured to generate a filtered transition matrix to be used as a basis for generating the content family. For instance, the control circuitry may determine a current day of the week and/or a current time of day and then filter the transition data to include only transition data for content selection commands received at a day or time within a degree of proximity to the current day of the week and/or current time. The control circuitry then generates a filtered transition matrix based on the filtered transition data, with each entry of the filtered transition matrix indicating a respective number of transitions from a first content item to a second content item caused by the content selection commands for the filtered transition data. The content family is generated based on the filtered transition matrix.

In a further aspect, the control circuitry is configured to generate a baseline transition matrix based on the transition data, with each entry of the baseline transition matrix indicating a respective number of transitions from a first content item to a second content item caused by the content selection commands. The control circuitry determines a current day of the week and/or a current time of day and filters the transition data to include only transition data for content selection commands received at a day or time within a degree of proximity to the current day or current time. The control circuitry then generates a filtered transition matrix based on the filtered transition data, with each entry of the filtered transition matrix indicating a respective number of transitions from the first content to the second content caused by the content selection commands for the filtered transition data. The control circuitry then generates an augmented transition matrix based on a weighted combination of the baseline transition matrix and the filtered transition matrix. The content family is generated based on the augmented transition matrix.

In some examples, based on the augmented transition matrix, the control circuitry is configured to generate an undirected graph comprising content vertices and content transition edges. The channel vertices correspond to channels in a channel lineup and the channel transition edges correspond to the channel transitions caused by the channel tuning commands. A local clustering coefficient, in some aspects, is computed for a content vertex from among the content vertices and the content family is generated for the content vertex based on the local clustering coefficient. For instance, the control circuitry may compare the local clustering coefficient to a threshold to determine whether the local clustering coefficient exceeds the threshold. In response to a determination that the local clustering coefficient exceeds the threshold, the content family is generated for that channel.

In yet a further aspect, the control circuitry is further configured to add a content item to the content family based on collaborative filtering of a plurality of additional content families generated based on content selection data from other devices. In this manner, families may be augmented to promote discovery of additional channels and/or content that may be of interest to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts an example data structure for channel tuning data, in accordance with some embodiments of the disclosure;

FIG. 7 depicts an example baseline channel transition matrix, in accordance with some embodiments of the disclosure;

FIG. 8 depicts an example filtered channel transition matrix, in accordance with some embodiments of the disclosure;

FIG. 12 depicts an example data structure for channel family data, in accordance with some embodiments of the disclosure.

DETAILED DESCRIPTION

Figure 1:
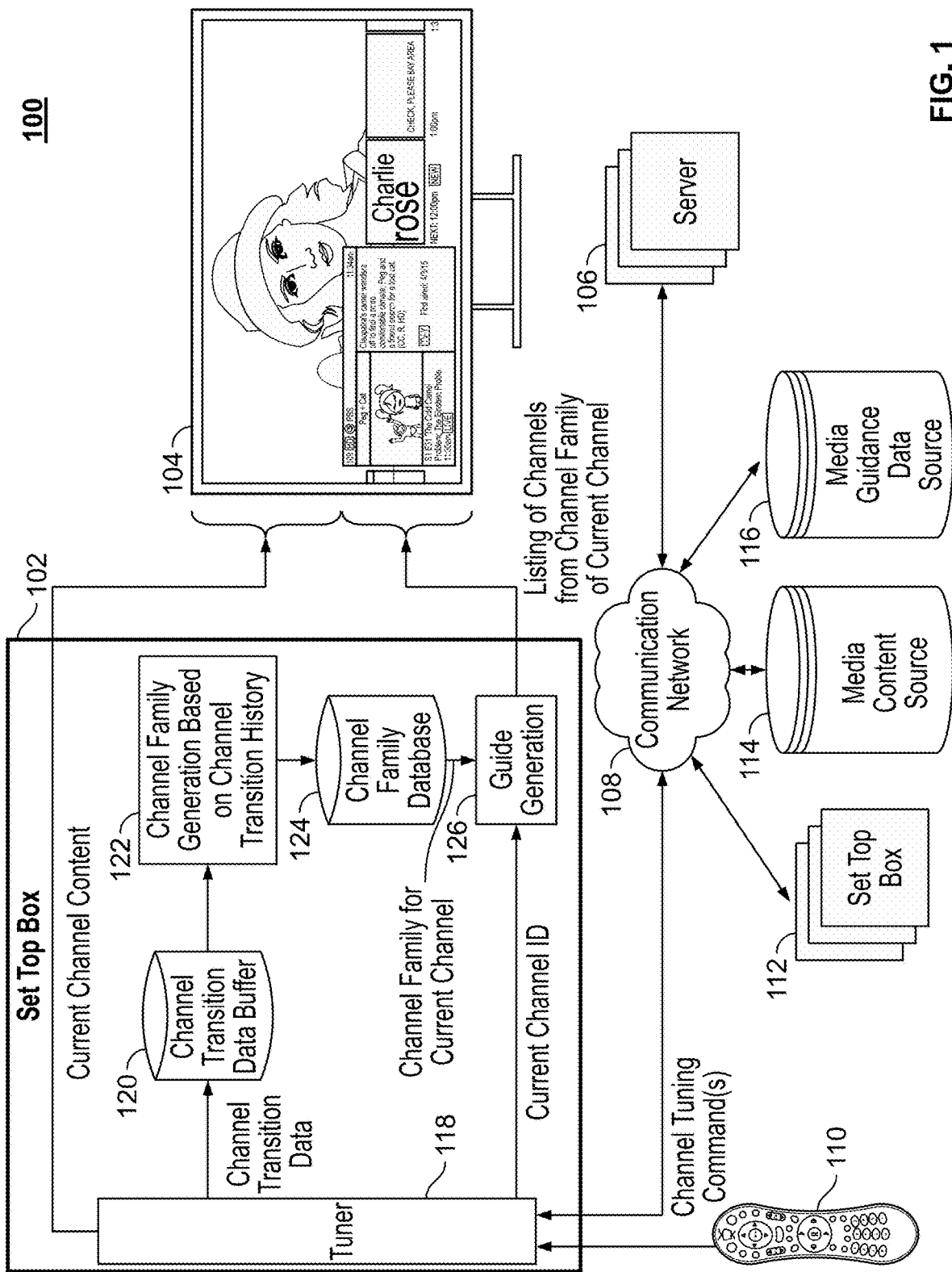
FIG. 1 shows an illustrative block diagram of a system for generating a sequence of channels for display via an abbreviated on-screen guide, in accordance with some embodiments of the disclosure.

FIG. 1 shows an illustrative block diagram of system 100 for generating a sequence of channels for display via an abbreviated on-screen guide, in accordance with some embodiments of the disclosure. Although FIG. 1 shows system 100 as including a number and configuration of individual components, in some embodiments, any number of the components of system 100 may be combined and/or integrated as one device. System 100 includes set-top box 102, display 104, server 106, communication network 108, remote control 110, one or more additional set-top boxes 112, media content source 114, and media guidance data source 116. Set-top box 102 is communicatively coupled to display 104 by way of communication paths, such as video signal paths. Communication network 108 communicatively couples various components of system 100 to one another. For instance, set-top box 102 is also communicatively coupled to server 106, communication network 108, remote control 110, one or more additional set-top boxes 112, media content source 114, and/or media guidance data source 116, by way of communication network 108. Communication network 108 may be any type of communication network, such as the Internet, a mobile phone network, mobile voice or data network (e.g., a 4G or LTE network), cable network, public switched telephone network, or any combination of two or more of such communication networks. Communication network 108 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths.

Set-top box 102 includes tuner 118, channel transition data buffer 120, channel family generator 122, channel family database 124, and guide generator 126. Tuner 118 is configured to receive channel tuning commands entered via remote control 110 and, in response to receiving the channel tuning commands, cause a channel transition from one channel (e.g., a tuned-from channel) to another channel (e.g., a tuned-to channel) of content provided to tuner 118 by server 106 and/or media content source 114 over communication network 108. Tuner 118 provides content of a currently tuned channel to display 104 for presentation. Tuner 118 is also configured to store channel transition data (sometimes referred to as channel tuning data), which describes such channel tuning events, in channel transition data buffer 120. In some aspects, channel transition data buffer 120 may be a first-in-first-out (FIFO) type of buffer that purges or overwrites channel transition data that is older than a fixed or configurable threshold, such as a date threshold and/or a time threshold. In this manner, channel transition data buffer 120 may avoid storing and relying upon data that is out-of-date or otherwise stale. An example data structure 500 for channel transition data is described below in connection with FIG. 5. In some examples, the channel tuning data comprises, for each of the channel tuning commands, an account identifier 502 that identifies a user account for which the channel tuning command was received, a tune-from channel identifier 504, a tune-to channel identifier 506, a transition date identifier 508, and/or a transition time identifier 510.

Based on channel transition data stored in channel transition data buffer 120, channel family generator 122 is configured to generate one or more channel families, with each channel family including specific channels of a channel lineup that, based on the channel transition data, is deemed likely to be of interest to a particular user (e.g., a user associated with the user account under which the channel transition commands were entered via remote control 110). Channel family generator 122 generates channel family data that describes each generated channel family, for instance, listing the particular channels that are included in each channel family. An example channel family data structure 1200 is described in further detail below in connection with FIG. 12. Channel family generator 122 stores the generated channel family data in channel family database 124. Guide generator 126 is configured to receive an identifier of a currently tuned channel from tuner 118 and, based on the currently tuned channel and based on a channel family stored in channel family database 124 for that channel, generate, for display via an abbreviated on-screen guide on display 104, a navigable listing or sequence of channels and corresponding channel guide data obtained from media guidance data source 116. Channel families generated in the above-noted manner thus become the basis for populating the abbreviated on-screen guide. When a user is tuned to a member of a given channel family, the abbreviated on-screen guide provides discovery for other channels in that family to which the user is likely to tune. When a new user comes into play, the user's mood changes, or the combination of users who are viewing content changes, and the user changes to a channel in a different channel family, the abbreviated on-screen guide adapts and provides discovery for the channels in the new family. Additional details regarding the features and functionality of system 100 are provided below.

Figure 2:
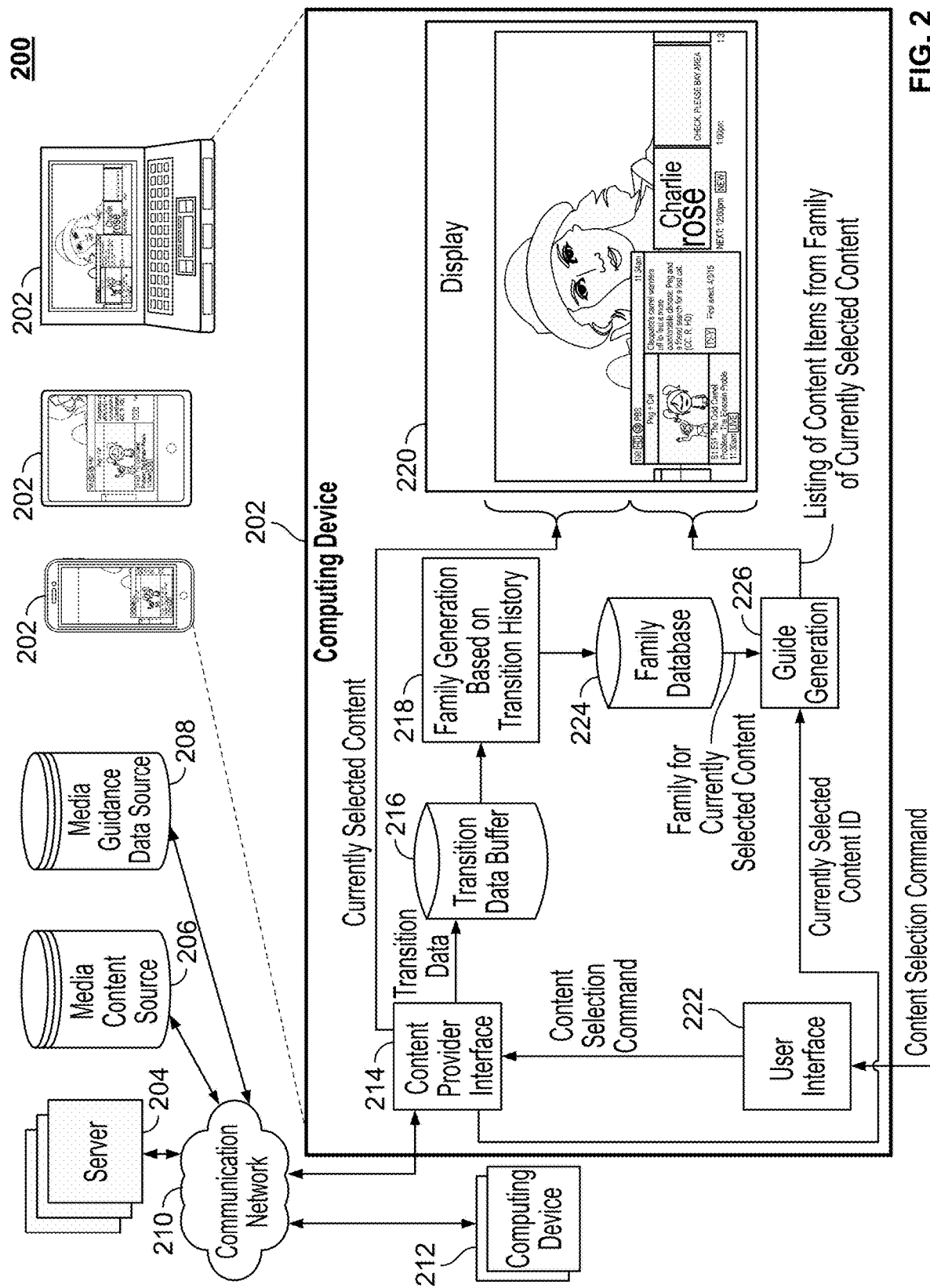
FIG. 2 shows an illustrative block diagram of a system for generating a sequence of content items for display via an abbreviated on-screen guide, in accordance with some embodiments of the disclosure.

FIG. 2 shows an illustrative block diagram of system 200 for generating a sequence of content items for display via an abbreviated on-screen guide, in accordance with some embodiments of the disclosure. Although FIG. 2 shows system 200 as including a number and configuration of individual components, in some embodiments, any number of the components of system 200 may be combined and/or integrated as one device. In various aspects, system 200 includes some components similar to those described above in connection with system 100, and so a description of such components and/or their functionality is not repeated here. In particular, system 200 includes server 204, media content source 206, media guidance data source 208, and communication network 210, which may correspond to, and have similar features or functionality as, server 106, media content source 114, media guidance data source 116, and communication network 108, respectively, of system 100. Instead of set-top box 102, remote control 110, and additional set-top boxes 112, however, system 200 includes computing device 202 and additional computing devices 212. Computing device 202 may be a smartphone, a tablet, a laptop computer, a desktop computer, a smart TV, or any type of computing device that has a user interface and a display and is configured to receive and visibly and/or audibly present items of content.

In some aspects, computing device 202 operates in a manner similar to that described above for set-top box 102, except instead of receiving channel selections entered via a remote control, and using a tuner to tune channels of content provided to computing device 202 by server 204 and/or media content source 206 via communication network 210, computing device 202 receives content item (or channel) selections entered via a user interface (e.g., a touchscreen, a microphone, or the like), and requests the selected content item for downloading and/or streaming from server 204 and/or media content source 206 over communication network 210. More specifically, computing device 202 includes content provider interface 214, transition data buffer 216, family generator 218, display 220, user interface 222, family database 224, and guide generator 226. User interface 222 may be a touchscreen, a computer mouse, a microphone, and/or any other type of user interface that enables a user to input content selections or other types of selections. Content provider interface 214 is configured to receive content selection commands (and/or category selection commands, genre selection commands, or any other type of selection commands) entered via user interface 222 and, in response to receiving the content selection commands, cause a transition from one content item (e.g., a tuned-from content item) to another content item (e.g., a tuned-to content item) provided to content provider interface 214 by server 204 and/or media content source 206 over communication network 210. Content provider interface 214 also provides currently selected content to display 220 for presentation. Content provider interface 214 is also configured to forward transition data, which describes such content selection events, for storage in transition data buffer 216. In some aspects, transition data buffer 216 may be a FIFO type of buffer that purges or overwrites transition data that is older than a fixed or configurable threshold, such as a date threshold and/or a time threshold. In this manner, transition data buffer 216 may avoid storing and relying upon data that is out-of-date or otherwise stale.

Based on transition data stored in transition data buffer 216, family generator 218 is configured to generate one or more families of content, content categories, and/or the like, with each family including specific items of content, items of content of specific categories, and/or the like, that, based on the transition data, are deemed likely to be of interest to a particular user (e.g., a user associated with the user account under which the transition commands were entered via user interface 222). Family generator 218 generates family data that describes each generated family, for instance, listing the particular content items, content item categories, and/or the like that are included in each family. Family generator 218 stores the generated channel data in family database 224.

Guide generator 226 is configured to receive an identifier of a currently selected content item from content provider interface 214 and, based on the currently selected content item and based on a family stored in family database 224 for that content item, generate, for display via an abbreviated on-screen guide on display 220, a navigable listing or sequence of content and corresponding guide data obtained from media guidance data source 208. Additional details regarding the features and functionality of system 200 are provided below.

Figure 3:
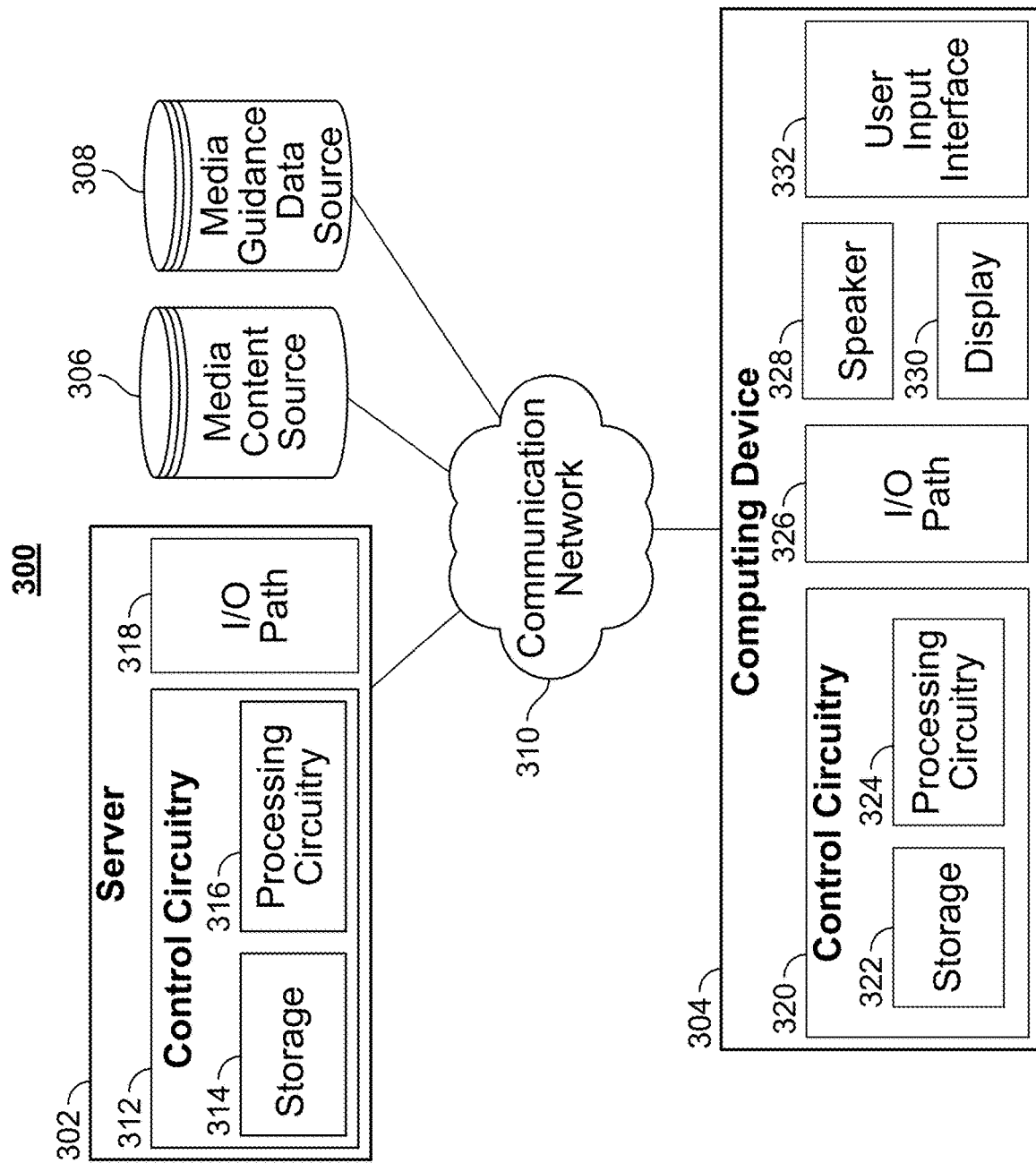
FIG. 3 is an illustrative block diagram showing additional details of the systems of FIG. 1 and/or FIG. 2, in accordance with some embodiments of the disclosure.

FIG. 3 is an illustrative block diagram showing additional details of systems 100 and/or 200, of FIG. 1 and/or FIG. 2, respectively, in accordance with some embodiments of the disclosure. In various embodiments, system 300 includes some components described above in connection with system 100 and/or system 200. For instance, in some aspects, server 302, media content source 306, media guidance data source 308, communication network 310, and/or computing device 304 of system 300 further represent server 106, media content source 114, media guidance data source 116, communication network 108, and/or set-top box 102, respectively, of system 100. Likewise, in other aspects, server 302, media content source 306, media guidance data source 308, communication network 310, and/or computing device 304 of system 300 further represent server 204, media content source 206, media guidance data source 208, communication network 210, and/or computing device 202 of system 200. Additionally, in various embodiments, components of set-top box 102 (e.g., tuner 118, channel transition data buffer 120, channel family generator 122, channel family database 124, guide generator 126) are implemented by one or more components of computing device 304, such as processing circuitry 324 and/or storage 322 of control circuitry 320. Likewise, components of computing device 202, in some examples, are implemented by one or more components of computing device 304, such as processing circuitry 324 and/or storage 322 of control circuitry 320. Although FIG. 3 shows certain numbers of components, in various examples, system 300 may include fewer than the illustrated components and/or multiples of one or more illustrated components.

Server 302 includes control circuitry 312 and I/O path 318, and control circuitry 312 includes storage 314 and processing circuitry 316. Computing device 304 includes control circuitry 320, I/O path 326, speaker 328, display 330, and user input interface 332. Control circuitry 320 includes storage 322 and processing circuitry 324. Control circuitry 312 and/or 320 may be based on any suitable processing circuitry such as processing circuitry 316 and/or 324. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 314, storage 322, and/or storages of other components of system 300 (e.g., storages of media content source 306, media guidance data source 308, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 314, storage 322, and/or storages of other components of system 300 may be used to store various types of content, metadata, media guidance data, and or other types of data. Non-volatile memory may also be used (e.g., to launch a boot-up routine and other instructions). Cloud-based storage may be used to supplement storages 314, 322 or instead of storages 314, 322. In some embodiments, control circuitry 312 and/or 320 executes instructions for an application stored in memory (e.g., storage 314 and/or 322). Specifically, control circuitry 312 and/or 320 may be instructed by the application to perform the functions discussed herein. In some implementations, any action performed by control circuitry 312 and/or 320 may be based on instructions received from the application. For example, the application may be implemented as software or a set of executable instructions that may be stored in storage 314 and/or 322 and executed by control circuitry 312 and/or 320. In some embodiments, the application may be a client/server application where only a client application resides on computing device 304, and a server application resides on server 302.

The application may be implemented using any suitable architecture. For example, it may be a stand-alone application wholly implemented on computing device 304. In such an approach, instructions for the application are stored locally (e.g., in storage 322), and data for use by the application is downloaded on a periodic basis (e.g., from an out-of-band feed, from an Internet resource, or using another suitable approach). Control circuitry 320 may retrieve instructions for the application from storage 322 and process the instructions to perform the functionality described herein. Based on the processed instructions, control circuitry 320 may determine what action to perform when input is received from user input interface 332.

In client/server-based embodiments, control circuitry 320 may include communication circuitry suitable for communicating with an application server (e.g., server 302) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 310). In another example of a client/server-based application, control circuitry 320 runs a web browser that interprets web pages provided by a remote server (e.g., server 302). For example, the remote server may store the instructions for the application in a storage device. The remote server may process the stored instructions using circuitry (e.g., control circuitry 312) and generate the displays discussed herein. Computing device 304 may receive the displays generated by the remote server and may display the content of the displays locally via display 330. This way, the processing of the instructions is performed remotely (e.g., by server 302) while the resulting displays, such as the display windows described elsewhere herein, are provided locally on computing device 304. Computing device 304 may receive inputs from the user via input interface 332 and transmit those inputs to the remote server for processing and generating the corresponding displays.

A user may send instructions to control circuitry 312 and/or 320 using user input interface 332. User input interface 332 may be any suitable user interface, such as a remote control, trackball, keypad, keyboard, touchscreen, touchpad, stylus input, joystick, voice recognition interface, a gaming controller, or other user input interfaces. User input interface 332 may be integrated with or combined with display 330, which may be a monitor, a television, a liquid crystal display (LCD), electronic ink display, or any other equipment suitable for displaying visual images.

Server 302 and computing device 304 may receive content and data via input/output (hereinafter "I/O") path 318 and 326, respectively. For instance, I/O path 318 may include a communication port configured to receive a live content stream from server 302 and/or media content source 306 via a communication network 310. Storage 322 may be configured to buffer the received live content stream for playback, and display 330 may be configured to present the buffered content, navigation options, alerts, and/or the like via a primary display window and/or a secondary display window. I/O paths 318, 326 may provide content (e.g., a live stream of content, broadcast programming, on-demand programming, Internet content, content available over a local area network (LAN) or wide area network (WAN), and/or other content) and data to control circuitry 312, 320. Control circuitry 312, 320 may be used to send and receive commands, requests, and other suitable data using I/O paths 318, 326. I/O paths 318, 326 may connect control circuitry 312, 320 (and specifically processing circuitry 316, 324) to one or more communication paths (described below). I/O functions may be provided by one or more of these communication paths but are shown as single paths in FIG. 3 to avoid overcomplicating the drawing.

Media content source 306 may include one or more types of content distribution equipment, including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 306 may be the originator of content (e.g., a television broadcaster, a Webcast provider, etc.) or may not be the originator of content (e.g., an on-demand content provider, an Internet provider of content of broadcast programs for downloading, etc.). Media content source 306 may include cable sources, satellite providers, on-demand providers, Internet providers, over-the-top content providers, or other providers of content. Media content source 306 may also include a remote media server used to store different types of content (e.g., including video content selected by a user) in a location remote from computing device 304. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content and/or data delivered to computing device 304 (e.g., by media content source 306 and/or media guidance data source 308) may be over-the-top (OTT) content or data. OTT content delivery allows Internet-enabled user devices, such as computing device 304, to receive content and data that is transferred over the Internet, including any content or data described herein, in addition to content and data received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 304.

Figure 4:
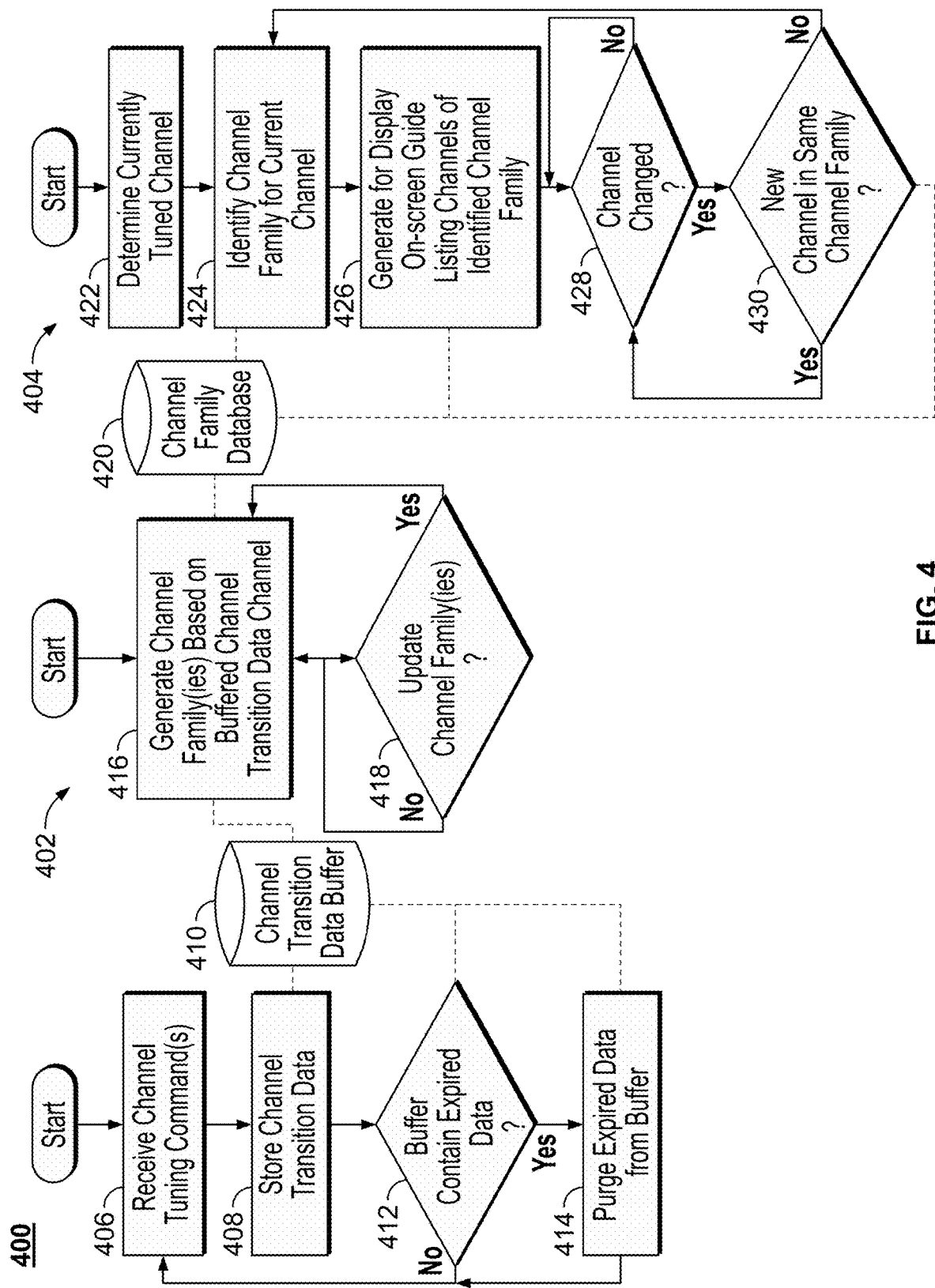
FIG. 4 depicts illustrative flowcharts of processes for generating channel tuning data and/or content selection data, generating a sequence of channels and/or content items, and displaying such a sequence via an abbreviated on-screen guide, in accordance with some embodiments of the disclosure.

Having described system 100, reference is now made to FIG. 4, which depicts illustrative flowcharts of process 400 for generating channel tuning data, process 402 for generating a sequence of channels based on channel tuning data, and process 404 for displaying such a sequence via an abbreviated on-screen guide, each process of which may be implemented by using system 300 (which, as described above may further represent system 100 and/or system 200), in accordance with some embodiments of the disclosure. To avoid repetition, much of the description of processes 400, 402, 404, 600, 900, 1000, and 1100 is provided in the context of generating a channel sequence based on channel tuning commands, for instance, implemented by system 100 and/or system 300. The description of processes 400, 402, 404, 600, 900, 1000, and 1100 herein, however, is similarly applicable, mutatis mutandis, to embodiments in which a sequence of content items, categories, or the like, is generated based on content selection commands, category selection commands, or the like, for instance, as implemented by system 200 and/or system 300. In various embodiments, individual steps of process 400, or any process described herein, may be implemented by one or more components of system 300. Although the present disclosure may describe certain steps of process 400 (and of other processes described herein) as being implemented by certain components of system 300, this is for purposes of illustration only, and it should be understood that other components of system 300 may implement those steps instead.

Before describing in detail processes 400, 402, and 404, which, in various embodiments, are executed in parallel with one another, an overview of those processes is provided. Processes 400, 402, and 404 are based on a model for channel tuning events. To this end, each channel may be deemed a state for the model. A user changes states by tuning to a new channel, with the new channel becoming the new state of the model. Each tuning event is a discrete-time event that relies only upon the current state of the model. Thus, the channel tuning events themselves can be modeled as a discrete-time Markov chain. The probability of a user changing from one state (or channel) to another is captured in a transition matrix for the discrete-time Markov chain. Each row of the transition matrix may thus, in some aspects, describe the most likely channels a user will tune to when viewing a particular channel. The transition matrix is generated from a collection of channel tuning events stored on a device, with the events themselves partitioned, in some examples, into buckets based on their collection date and/or time. In some aspects, channel tuning events older than a particular threshold are purged from storage and a running total for each entry of the transition matrix is stored in memory, with purged event totals being decremented from these running totals as they become out-of-date and new events being added to the running totals as they are received. Probabilities, in some examples, may be computed by dividing channel tune events by the total number of channel tuning events for a particular channel, with running counts of total channel tuning events being maintained in storage.

In some aspects, a transition matrix generated in the above-noted manner is used as the basis for populating an abbreviated on-screen guide with channels. In other examples, as described elsewhere herein, the transition matrix is used to identify or infer one or more users presently viewing content and/or moods of such users, to assist in channel family identification and/or selection. For instance, channel families may be generated or regenerated at set times throughout the day to rebuild channel families as appropriate, allowing for weighing of data points that occur at particularly relevant points in time. For example, when executing on a Saturday afternoon, data points collected on previous Saturday afternoons may be weighted more highly than data points collected, say, on Tuesday evenings. To that end, the transition matrix may be filtered, weighted, and/or augmented.

With reference to FIG. 4, process 400 begins at 406, at which control circuitry 320 receives channel tuning commands entered via user input interface 332, such as remote control 110. At 408, control circuitry 320 stores the received channel tuning data in channel transition data buffer 410 (which may correspond to channel transition data buffer 120 and/or transition data buffer 216). An example data structure 500 for channel tuning data is shown in FIG. 5, as described above.

At 412, control circuitry 320 determines whether channel transition data buffer 410 includes any expired channel tuning data, such as data that was received and/or stored on a day and/or at a time earlier than the present day and/or time by at least a threshold amount. If channel transition data buffer 410 includes expired channel tuning data ("Yes" at 412), then at 414 control circuitry 320 purges or overwrites the expired channel transition data in channel transition data buffer 410. As mentioned above, purging and/or overwriting channel transition data in this manner avoids reliance upon out-of-date or stale channel transition data that may no longer be relevant for a user. If channel transition data buffer 410 includes no expired channel tuning data ("No" at 412), then control passes back to 406 to receive additional channel tuning commands, if any.

Process 402 begins with 416, at which control circuitry 320 generates, and stores in channel family database 420 (which may correspond to channel family database 124 and/or family database 224), one or more channel families (and/or content families, category families, or other types of families) based on the channel tuning data stored in channel transition data buffer 410. Additional details on how control circuitry 320 may generate one or more channel families at 416 are provided below in connection with FIG. 6 through FIG. 12. At 418, control circuitry 320 determines whether to update any channel families stored in channel family database 420. In various aspects, updating of channel families stored in channel family database 420 is triggered in a variety of ways. As one example, channel families are automatically updated periodically, such as after a predetermined or configurable update period has elapsed. In another example, channel families are updated in response to control circuitry 320 having received at least a threshold amount of channel tuning commands since a most recent update of the channel families. If control circuitry 320 determines that one or more channel families stored in channel family database 420 are to be updated ("Yes" at 418), then control passes back to 416 to update the one or more channel families in the manner described above. If, on the other hand, control circuitry 320 determines that no channel family stored in channel family database 420 is to be updated yet ("No" at 418), then control circuitry 320 waits, for instance for a predetermined wait period, to repeat the determination at 418 as to whether a channel update is warranted.

Process 404 begins with 422, at which control circuitry 320 determines a currently tuned channel. For instance, with reference to FIG. 1, tuner 118 communicates a current channel identifier to guide generator 126. At 424, based on the currently tuned channel identifier determined at 422, control circuitry 320 identifies a channel family for the currently tuned channel. For example, control circuitry 320 performs a lookup in channel family database 420 to identify a channel family identifier that is associated with the currently tuned channel, as described in further detail below in connection with FIG. 12. In some embodiments, if the currently tuned channel is not associated with any channel families in channel family database 420, then a default channel family, for instance, a channel family including an entire channel lineup, is used as the channel family for the currently tuned channel. At 426, control circuitry 320 generates for display, for instance, via display 104, an on-screen guide listing channels of the channel family identified at 424.

At 428, control circuitry 320 determines whether, subsequent to the channel family being identified at 424, a channel tuning command has been received which may warrant identification of a different channel family. If no channel tuning command has been received ("No" at 428), then control circuitry 320 waits, for instance for a predetermined wait period, to repeat the determination at 428 as to whether a channel has been changed. If, on the other hand, a channel tuning command has been received ("Yes" at 428), then at 430 control circuitry 320 determines whether the new tuned-to channel is included in the same channel family that was identified at 424. If control circuitry 320 determines that the new tuned-to channel is included in the same channel family that was identified at 424 ("Yes" at 430), then no change is made to the channel family being used to generate the on-screen guide at 426, and control passes back to 428 to repeat the determination as to whether the channel has been changed yet again. If, on the other hand, control circuitry 320 determines that the new tuned-to channel is not included in the same channel family that was identified at 424 ("No" at 430), then control passes to 424 to identify a channel family to which the new tuned-to channel belongs, in the manner described above. In this manner, for instance, viewing a channel that overlaps with multiple families will not cause a chaotic change to the abbreviated lineup in the abbreviated on-screen guide.

Figure 6:
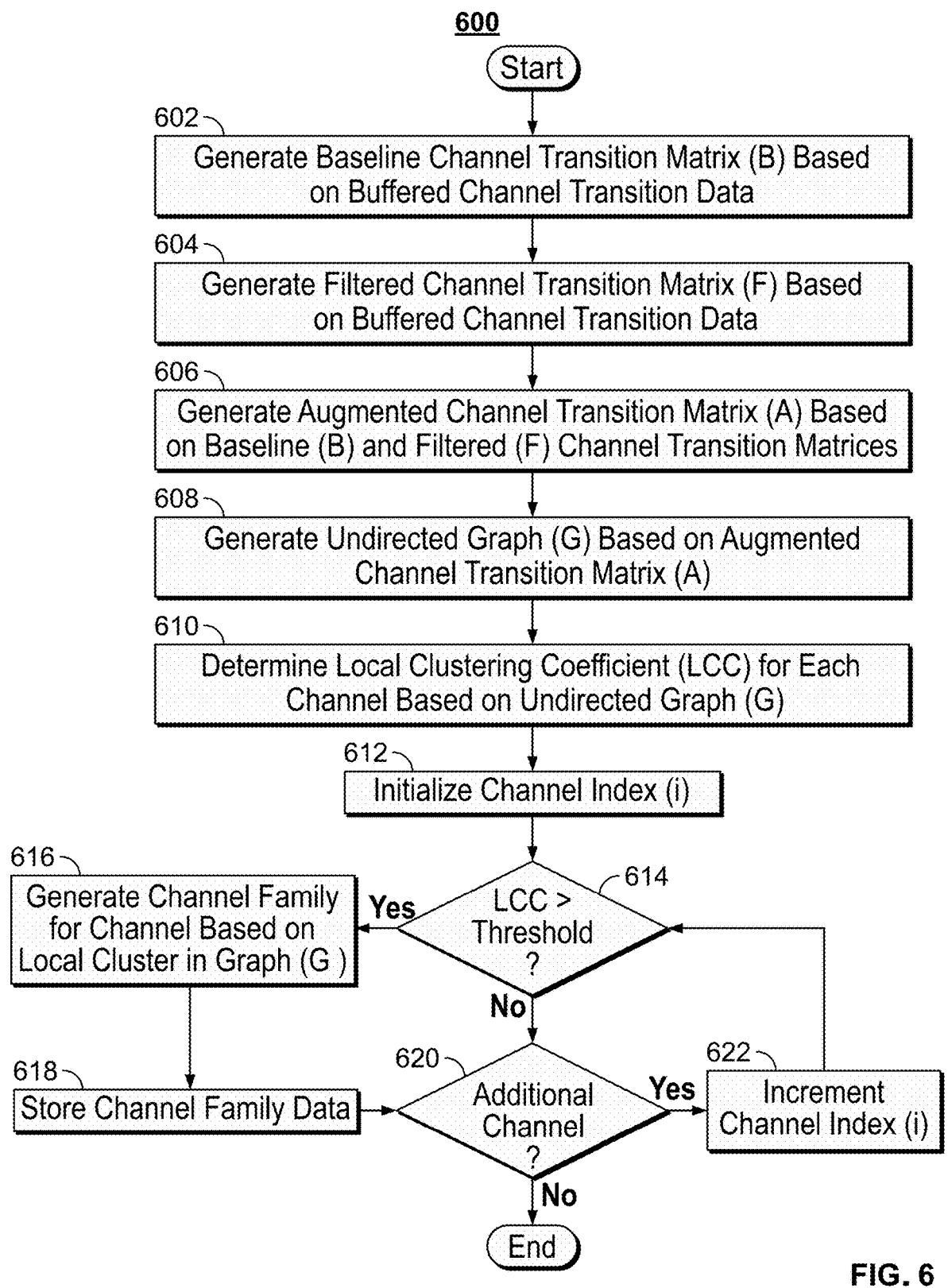
FIG. 6 depicts an illustrative flowchart of a process for generating a channel family based on channel tuning data, in accordance with some embodiments of the disclosure.

FIG. 6 depicts an illustrative flowchart of a process 600 for generating a channel family based on channel tuning data, in accordance with some embodiments of the disclosure. In some aspects, process 600 further represents process 416 of process 402 described above in connection with FIG. 4. At 602, based on buffered channel transition data stored in channel family database 420, control circuitry 320 generates a baseline channel transition matrix (B), which generally accounts for channel tuning events received for the computing device 304. FIG. 7 depicts an example baseline channel transition matrix 700, in accordance with some embodiments of the disclosure. The baseline channel transition matrix (B) 700 includes multiple rows 702 and multiple columns 704. Each entry 706 of baseline channel transition matrix (B) 700 is indexed by a row and a column that indicate a tune-from channel and a tune-to channel, respectively. Each value 706 indicates a cumulative number of tuning transitions received and stored for that particular combination of a tune-from channel 702 and a tune-to channel 704 (e.g., excluding any channel transition events that may have been purged to implement a sliding window accumulator functionality).

At 604, control circuitry 320 generates a filtered channel transition matrix (F) based on the buffered channel transition data stored in channel family database 420. Filtered channel transition matrix (F) includes a filtered set of day and/or time segments from the available channel tuning event data, such as only channel tuning events received on Saturdays between noon and 6:00 PM. FIG. 8 depicts an example filtered channel transition matrix (F) 800, in accordance with some embodiments of the disclosure. The filtered channel transition matrix (F) 800 includes multiple rows 802 and multiple columns 804. Each entry 806 of filtered channel transition matrix (F) 800 is indexed by a row and a column that indicate a tune-from channel and a tune-to channel, respectively. Each value 806 indicates a cumulative number of tuning transitions received and stored for that particular combination of a tune-from channel 702 and a tune-to channel 704 within specified day and/or time filter criteria, which may be based on a current day and/or time.

At 606, control circuitry 320 generates an augmented channel transition matrix (A) based on the baseline channel transition matrix (B) and the filtered channel transition matrix (F) generated at 602 and 604, respectively. In general, as described in further detail below in the context of FIG. 9, the augmented channel transition matrix (A) is generated as a weighted combination of the baseline channel transition matrix (B) and the filtered channel transition matrix (F), such as to more heavily weight the filtered data that may be more relevant than the unfiltered data. At 608, control circuitry 320 generates an undirected graph (G) based on the augmented channel transition matrix (A) generated at 606. The undirected graph is used to identify channel families. At 610, control circuitry 320 determines a local clustering coefficient (LCC) for each channel, or each channel vertex, based on the graph (G) generated at 608. For instance, control circuitry 320 may compute the local clustering coefficient as a ratio of actual edges in a neighborhood in the graph (e.g., edges that are connected to a particular vertex in the graph) to the total possible number of edges in that neighborhood. In this manner, when a neighborhood in the graph has a local clustering coefficient that exceeds a particular threshold, for example, that neighborhood may be captured as a channel family and assigned a channel family identifier.

At 612, control circuitry 320 initializes a channel index (i), for instance, by setting the channel index (i) equal to a first channel among the multiple channels of a channel lineup. At 614, control circuitry 320 determines whether the local clustering coefficient, for the channel that corresponds to the current value of the channel index (i), exceeds a threshold. If control circuitry 320 determines that the local clustering coefficient for the channel exceeds the threshold ("Yes" at 614), then at 616 control circuitry 320 generates a channel family for the channel based on its local cluster indicated in the graph (G) generated at 608. At 618, control circuitry 320 stores in channel family database 420 channel family data based on the channel family generated at 616. If, on the other hand, control circuitry 320 determines that the local clustering coefficient for the channel does not exceed the threshold ("No" at 614), then at 620 control circuitry 320 determines whether an additional channel remains to be processed in the channel lineup to determine whether any channel family is to be created for the additional channel. If an additional channel remains to be processed to determine whether any channel family is to be created for the additional channel ("Yes" at 620), then at 622 control circuitry 320 increments the channel index to correspond to the additional channel, and control passes back to 614 to repeat the determination for that channel as described above. If no additional channel remains to be processed in the channel lineup ("No" at 620), then process 600 terminates.

Figure 9:
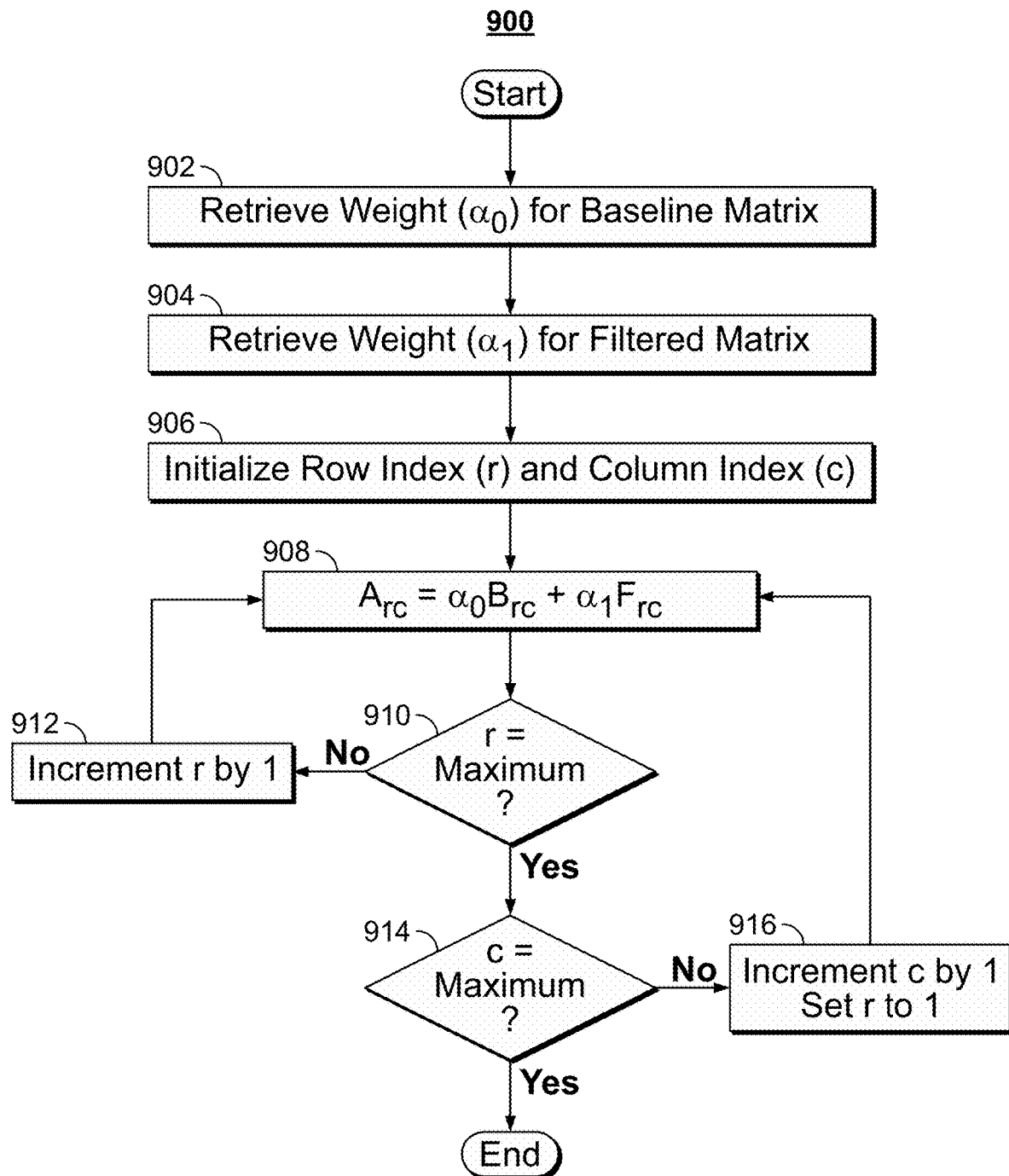
FIG. 9 depicts an illustrative flowchart of a process for generating an augmented channel matrix based on baseline and filtered channel transition matrices, in accordance with some embodiments of the disclosure.

FIG. 9 depicts an illustrative flowchart of process 900 for generating an augmented channel matrix based on baseline and filtered channel transition matrices, in accordance with some embodiments of the disclosure. In some aspects, process 900 further represents process 606 of process 600 described above in connection with FIG. 6. At 902, control circuitry 320 retrieves from storage 322 a weight value ($\alpha_0$) for the baseline matrix (B) that was generated at 602. At 904, control circuitry 320 retrieves from storage 322 a weight value ($\alpha_1$) for the filtered matrix (F) that was generated at 604. At 906, control circuitry 320 initializes a row index (r) and a column index (c). At 908, control circuitry 320 computes the element of the augmented channel matrix (A) at the $r^{th}$ row and $c^{th}$ column ($A_{rc}$) according to equation (1) below.

$$A_{rc} = \alpha_0 B_{rc} + \alpha_1 F_{rc} \qquad (1)$$

At 910, control circuitry 320 determines whether the row index r has reached the maximum number, namely, the total number of rows to be included in augmented channel matrix A. If the row index r has not reached the total number of rows to be included in augmented channel matrix A ("No" at 910), then at 912 control circuitry 320 increments the row index r by 1 and passes control back to 908 to compute the element of the augmented channel matrix (A) for the new row and the $c^{th}$ column ($A_{rc}$) according to equation (1) in the manner described above. If the row index r has reached the total number of rows to be included in augmented channel matrix A ("Yes" at 910), then at 914 control circuitry 320 determines whether the column index c has reached the maximum number, namely, the total number of columns to be included in augmented channel matrix A. If the column index c has not reached the total number of columns to be included in augmented channel matrix A ("No" at 914), then at 916 control circuitry 320 increments the column index c by 1, resets the row index r to 1, and passes control back to 908 to compute the element of the augmented channel matrix (A) for the new row r and the c column ($A_{rc}$) according to equation (1) in the manner described above. If the column index c has reached the total number of columns to be included in augmented channel matrix A ("Yes" at 914), then process 900 terminates.

Figure 10:
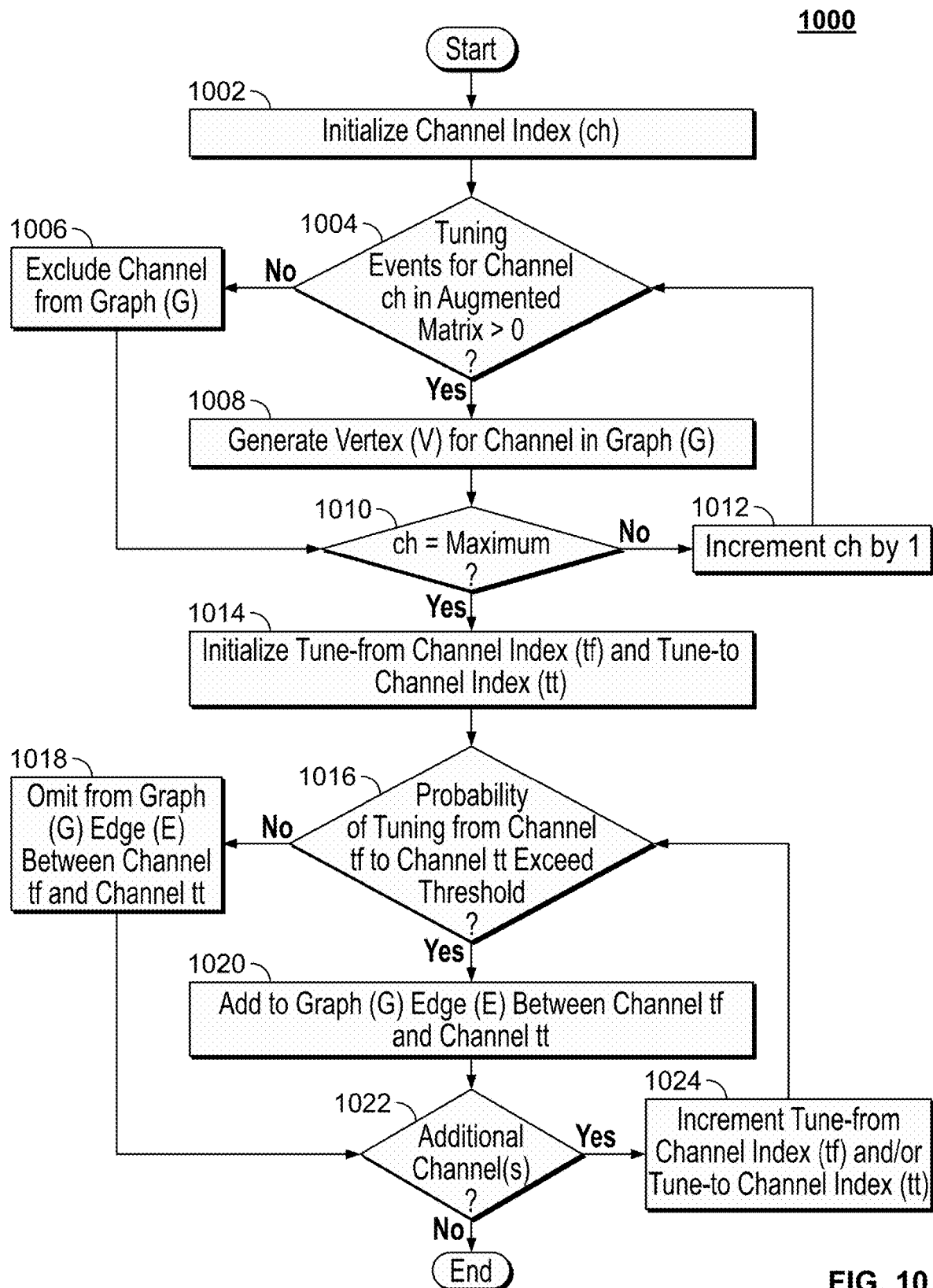
FIG. 10 depicts an illustrative flowchart of a process for generating an undirected graph based on an augmented channel transition matrix, in accordance with some embodiments of the disclosure.

FIG. 10 depicts an illustrative flowchart of process 1000 for generating an undirected graph based on an augmented channel transition matrix, in accordance with some embodiments of the disclosure. In some aspects, process 1000 further represents process 608 of process 600 described above in connection with FIG. 6. At 1002, control circuitry 320 initializes a channel index (ch), for instance, by setting the channel index to correspond to a first channel among the multiple channels of a channel lineup. At 1004, control circuitry 320 determines whether the augmented matrix (A) generated at 606 and/or 900 includes any channel tuning events (or channel transition events) for the channel designated by channel index (ch). If the augmented matrix (A) does not include any channel tuning events for the channel designated by channel index (ch) ("No" at 1004), then at 1006 control circuitry 320 excludes that channel from the graph (G). If, on the other hand, the augmented matrix (A) includes one or more channel tuning events for the channel designated by channel index (ch) ("Yes" at 1004), then at 1008 control circuitry 320 generates a vertex (V) for that channel to be included in the graph (G). At 1010, control circuitry 320 determines whether the channel index (ch) has reached its maximum, such as by reaching the final channel included in the channel lineup. If the channel index (ch) has not reached its maximum ("No" at 1010), then at 1012 control circuitry 320 increments the channel index (ch) by 1 channel and passes control back to 1004 to repeat the determination at 1004 for the newly indexed channel in the manner described above.

If, on the other hand, the channel index (ch) has reached its maximum ("Yes" at 1010), then at 1014 control circuitry 320 initializes a tune-from channel index (tf) and a tune-to channel index (tt), for instance, by setting the tune-from channel index (tf) and the tune-to channel index (tt) to a first and a second channel, respectively among the channels of the channel lineup. At 1016, control circuitry 320 determines whether a probability of tuning from the channel indexed by the tuned-from channel index (tf) to the channel indexed by the tuned-to channel index (tt) exceeds a threshold. Such a probability, for instance, may be computed by dividing channel tune events by the total number of channel tuning events for a particular channel. If the probability of tuning from the channel indexed by the tuned-from channel index (tf) to the channel indexed by the tuned-to channel index (tt) does not exceed the threshold ("No" at 1016), then at 1018 control circuitry 320 omits from graph (G) an edge (E) that would otherwise connect the tune-from channel (tf) to the tune-to channel (tt). Control then passes to 1022, which is described below. If, on the other hand, the probability of tuning from the channel indexed by the tuned-from channel index (tf) to the channel indexed by the tuned-to channel index (tt) exceeds the threshold ("Yes" at 1016), then at 1020 control circuitry 320 adds to graph (G) an edge (E) that connects the tune-from channel (tf) to the tune-to channel (tt). At 1022, control circuitry 320 determines whether any additional channels of the channel lineup remain to be processed to complete generation of graph (G). If one or more additional channels of the channel lineup remain to be processed ("Yes" at 1022), then at 1024 control circuitry 320 increments the tune-from channel index (tf) and/or the tune-to channel index (tt) and passes control back to 1016 to repeat the determination for the newly indexed tune-from and/or tune-to channels in the manner described above. If, on the other hand, no additional channel of the channel lineup remains to be processed ("No" at 1022), then generation of graph (G) is complete and process 1000 terminates.

Figure 11:
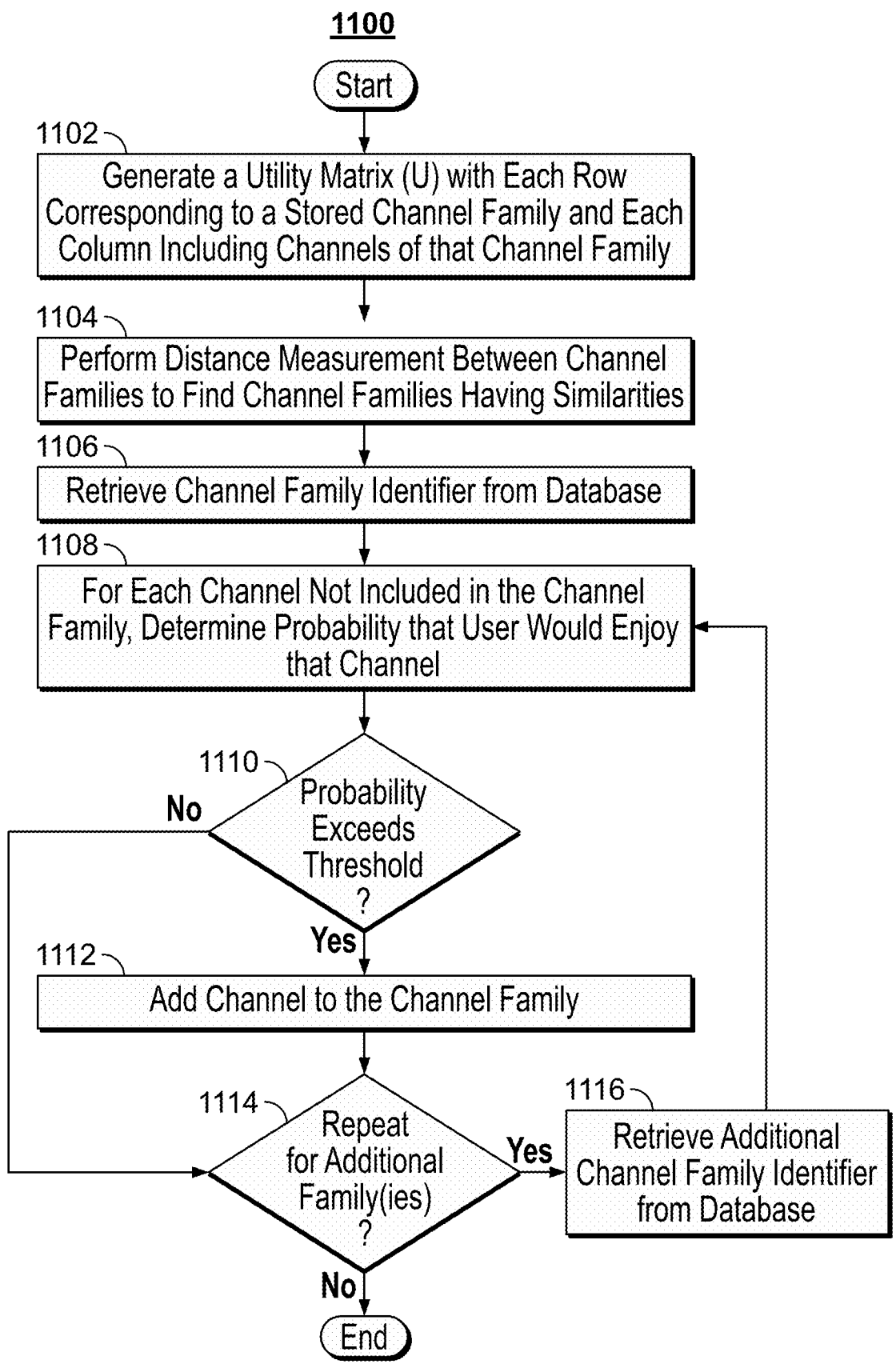
FIG. 11 depicts an illustrative flowchart of a process for augmenting a channel family based on collaborative filtering, in accordance with some embodiments of the disclosure.

FIG. 11 depicts an illustrative flowchart of process 1100 for augmenting a channel family based on collaborative filtering, in accordance with some embodiments of the disclosure. Before describing process 1100 in detail, an overview is provided. In some aspects, in addition to capturing per-user behavior, channel families (or content families, category families, or other types of families) generated in the manner described herein capture user moods (such as a user being in the mood to watch college football on Saturday afternoons) and/or combinations of users (such as a user repeatedly having a movie night with another user on Saturday evenings). Such scenarios may involve a user scanning a small subset of channels for content to watch, creating node clusters in graph (G) described herein. In some aspects, channel families derived by a computing device 304 for a particular user account are posted to a backend service (e.g., hosted by server 302), which also receives such channel families from a large population of devices across communication network 310. Server 302 then applies a collaborative filtering step, introducing a recommendation engine that adds one or more additional channels (or content items, categories, or the like) to a family, based on collaborative filtering involving data from other users having similar tastes.

As one example, since each channel family may correspond to a unique combination of users and their moods, the channel family can be viewed as a unique user row to a collaborative filtering utility matrix. Each channel family is added as a row to a utility matrix of the most recent set of received channel families (allowing old or stale channel families to expire), and a distance measurement is applied to find similar channel families (e.g., channel families of users having similar tastes). Using the collection of these similar channel families, the collaborative filtering process walks through each blank entry in an input channel family row of the utility matrix and estimates how likely the original user would enjoy that given channel. Since this backend service has access to program metadata and channel information, channel similarity can also be made available to this collaborative filtering step. For example, channels can be categorized into genres, where channels of the same genres as those in the input channel family would be weighted more highly for a recommendation.

Referring now to FIG. 11, in some aspects, process 1100 is implemented as part of process 416 of process 400 described above in connection with FIG. 4 and/or is implemented by control circuitry 312 of server 302 for computing device 304. At 1102, control circuitry 312 generates a utility matrix (U) with each row corresponding to a channel family stored in channel family database 420, or a version of channel family database 420 that is provided to server 302 over communication network 310, and each column including channels of that channel family. At 1104, control circuitry 312 performs a distance measurement between channel families to find channel families having similarities. At 1106, control circuitry 312 retrieves a channel family identifier from the channel family database 420. At 1108, control circuitry 312 determines, for each channel that is included in the channel lineup but is not included in the channel family, a probability that a user associated with the user account for that channel family would enjoy that channel. At 1110, control circuitry 312 determines whether the probability computed at 1108 exceeds a threshold. If the probability computed at 1108 exceeds the threshold ("Yes" at 1110), then at 1112 control circuitry 312 adds that channel to the channel family. If, on the other hand, the probability computed at 1108 does not exceed the threshold ("No" at 1110), then control passes to 1114. At 1114, control circuitry 312 determines whether any additional channel families stored in channel family database 420 remain to be processed for augmentation based on collaborative filtering. If one or more additional channel families stored in channel family database 420 remain to be processed for augmentation based on collaborative filtering ("Yes" at 1114), then at 1116 control circuitry 312 retrieves from channel family database 420 an identifier for such an additional channel family and passes control back to 1108 to repeat the determination for that additional channel family in the manner described above. If, on the other hand, no additional channel family stored in channel family database 420 remains to be processed for augmentation based on collaborative filtering ("No" at 1114), then process 1100 terminates.

FIG. 12 shows an example data structure 1200 for channel family data, such as channel family data that may be generated at 416, stored in channel family database 420, and/or augmented by way of process 1100 in the manner described above. Each item of channel family data includes an account identifier 1202 that identifies a user account for which the channel family was created, a channel family identifier 1204 that uniquely identifies the channel family among multiple channel families generated for that user account, and a listing of channels 1206 that belong to that channel family.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a content item sequence for display via an abbreviated on-screen guide, the method comprising:
   receiving content selection commands entered via a user interface;
   storing, in a buffer, transition data describing content item playback transitions caused by the content selection commands, wherein the transition data comprises, for each respective content item playback transition caused by a corresponding content selection command, an indication that playback was switched from a first content item to a second content item in response to receiving the content selection command;
   generating a baseline transition matrix based on the transition data, each entry of the baseline transition matrix indicating a respective number of transitions from the first content item to the second content item caused by the content selection commands;
   determining at least one of a current day or a current time;
   filtering the transition data to include only transition data for content selection commands received at a day or time within a degree of proximity to the current day or current time;
   generating a filtered transition matrix based on the filtered transition data, each entry of the filtered transition matrix indicating a respective number of transitions from the first content to the second content caused by the content selection commands for the filtered transition data;
   generating, based on the transition data, a content family comprising a plurality of content items;
   determining whether a content item currently being played back is included in the content family; and
   in response to determining that the currently played-back content item is included in the content family, generating for display an on-screen guide comprising an abbreviated content item listing of the plurality of content items of the content family.

2. The method of claim 1, the transition data comprising, for each of the content selection commands, a transition-from content identifier, a transition-to content identifier, and at least one of a transition date identifier or a transition time identifier.

3. The method of claim 1, wherein the determining whether the currently played-back content item is included in the content family comprises:
   obtaining an identifier of the currently played-back content item;
   retrieving, from a memory, identifiers of the plurality of content items; and
   determining whether the identifiers of the plurality of content items of the content family include the currently played-back content item identifier.

4. The method of claim 1,
   wherein the generating of the content family is further based on the transition matrix.

5. The method of claim 1,
   wherein the generating of the content family is further based on the filtered transition matrix.

6. The method of claim 1, further comprising:
   generating an augmented transition matrix based on a weighted combination of the baseline transition matrix and the filtered transition matrix, wherein the generating the content family is further based on the augmented transition matrix.

7. The method of claim 6, further comprising:
   generating, based on the augmented transition matrix, an undirected graph comprising content vertices and content transition edges; and
   computing a local clustering coefficient for a content vertex from among the content vertices, wherein the generating of the content family is performed for the content vertex based on the local clustering coefficient.

8. The method of claim 7, wherein the content vertices correspond to content sources and the content transition edges correspond to the content item playback transitions caused by the content selection commands.

9. The method of claim 7, further comprising:
   comparing the local clustering coefficient to a threshold to determine whether the local clustering coefficient exceeds the threshold,
   wherein the content family is generated in response to a determination that the local clustering coefficient exceeds the threshold.

10. The method of claim 1, further comprising:
    adding a content item to the content family based on collaborative filtering of a plurality of additional content families generated based on content selection data from other devices.

11. A system for generating a content item sequence for display via an abbreviated on-screen guide, the system comprising:

a communication port configured to receive content selection commands entered via a user interface;

a memory configured to store, in a buffer, transition data describing content item playback transitions caused by the content selection commands, wherein the transition data comprises, for each respective content item playback transition caused by a corresponding content selection command, an indication that playback was switched from a first content item to a second content item in response to receiving the content selection command; and control circuitry configured to:
  generate a baseline transition matrix based on the transition data, each entry of the baseline transition matrix indicating a respective number of transitions from the first content item to the second content item caused by the content selection commands;
  determine at least one of a current day or a current time;
  filter the transition data to include only transition data for content selection commands received at a day or time within a degree of proximity to the current day or current time;
  generate a filtered transition matrix based on the filtered transition data, each entry of the filtered transition matrix indicating a respective number of transitions from the first content to the second content caused by the content selection commands for the filtered transition data;
  generate, based on the transition data, a content family comprising a plurality of content items;
  determine whether a content item currently being played back is included in the content family; and
  in response to determining that the currently played-back content item is included in the content family, generate for display an on-screen guide comprising an abbreviated content item listing of the plurality of content items of the content family.

12. The system of claim 11, wherein the transition data comprises, for each of the content selection commands, a transition-from content identifier, a transition-to content identifier, and at least one of a transition date identifier or a transition time identifier.

13. The system of claim 11, wherein the control circuitry is configured to determine whether the currently played-back content item is included in the content family by:
  obtaining an identifier of the currently played-back content item;
  retrieving, from a memory, identifiers of the plurality of content items; and
  determining whether the identifiers of the plurality of content items of the content family include the currently played-back content item identifier.

14. The system of claim 11, wherein the control circuitry is further configured to:
  generate the content family further based on the transition matrix.

15. The system of claim 11, wherein the control circuitry is further configured to:
  generate the content family further based on the filtered transition matrix.

16. The system of claim 11, wherein the control circuitry is further configured to:
  generate an augmented transition matrix based on a weighted combination of the baseline transition matrix and the filtered transition matrix, and generate the content family further based on the augmented transition matrix.

17. The system of claim 16, wherein the control circuitry is further configured to:
  generate, based on the augmented transition matrix, an undirected graph comprising content vertices and content transition edges; and
  compute a local clustering coefficient for a content vertex from among the content vertices, generate the content family for the content vertex based on the local clustering coefficient.

18. The system of claim 17, wherein the content vertices correspond to content sources and the content transition edges correspond to the content item playback transitions caused by the content selection commands.

19. The system of claim 17, wherein the control circuitry is further configured to:
  compare the local clustering coefficient to a threshold to determine whether the local clustering coefficient exceeds the threshold, and
  generate the content family in response to a determination that the local clustering coefficient exceeds the threshold.

20. The system of claim 11, wherein the control circuitry is further configured to:
  add a content item to the content family based on collaborative filtering of a plurality of additional content families generated based on content selection data from other devices.

* * * * *